(12) United States Patent
Thomas et al.

(10) Patent No.: US 8,854,070 B2
(45) Date of Patent: Oct. 7, 2014

(54) CHARGING DEVICE, DETECTION SYSTEM, AND METHOD OF TESTING A DETECTION SYSTEM

(75) Inventors: Cecilia Maria Thomas, Shepherdsville, KY (US); John Kenneth Hooker, Louisville, KY (US); Scott Jeffrey Hall, Louisville, KY (US); Prerana Gajanan Kulkarni, Sellersburg, IN (US)

(73) Assignee: General Electric Company, Schenectady, NY (US)

( * ) Notice: Subject to any disclaimer, the term of this patent is extended or adjusted under 35 U.S.C. 154(b) by 454 days.

(21) Appl. No.: 13/358,672

(22) Filed: Jan. 26, 2012

(65) Prior Publication Data

US 2013/0193907 A1 Aug. 1, 2013

(51) Int. Cl.
 *G01R 35/00* (2006.01)
 *G01N 27/416* (2006.01)
 *G01R 15/00* (2006.01)
 *G01R 31/36* (2006.01)
 *G01R 19/00* (2006.01)

(52) U.S. Cl.
 USPC .......... 324/750.3; 324/435; 324/436; 702/57; 702/63; 702/64

(58) Field of Classification Search
 USPC ............. 324/750.3, 435, 436; 703/57, 63, 64; 702/57, 63, 64
 See application file for complete search history.

(56) References Cited

U.S. PATENT DOCUMENTS

| | | | |
|---|---|---|---|
| 6,984,988 B2 | 1/2006 | Yamamoto | |
| 7,292,042 B2 | 11/2007 | Morita et al. | |
| 7,554,333 B2 | 6/2009 | Morita | |
| 7,714,587 B2 | 5/2010 | Lindsey et al. | |
| 7,808,245 B2 | 10/2010 | Lindsey et al. | |
| 2011/0029144 A1 | 2/2011 | Muller et al. | |
| 2012/0080944 A1* | 4/2012 | Recker et al. | 307/25 |
| 2013/0169228 A1* | 7/2013 | Yang | 320/110 |
| 2013/0320923 A1* | 12/2013 | Hooker et al. | 320/109 |
| 2014/0002024 A1* | 1/2014 | Ang et al. | 320/109 |

FOREIGN PATENT DOCUMENTS

WO 2011031801 A2 6/2011

* cited by examiner

*Primary Examiner* — M'Baye Diao
(74) *Attorney, Agent, or Firm* — General Electric Company

(57) ABSTRACT

A charging device for a power storage device includes a power conduit configured to deliver current to the power storage device and a detection system configured to be coupled to the power conduit. The detection system includes a current control device coupled to the power conduit and configured to control the current delivered to the power storage device. The detection system also includes a test conductor, a current sensor coupled to the test conductor, and a controller coupled to the current sensor by the test conductor. The current sensor is arranged to detect an amount of current within the test conductor and configured to generate a current measurement signal representative of the current detected. The controller is configured to generate a test signal, transmit the test signal through the test conductor, receive the current measurement signal, and determine a status of the detection system based on the current measurement signal.

20 Claims, 4 Drawing Sheets

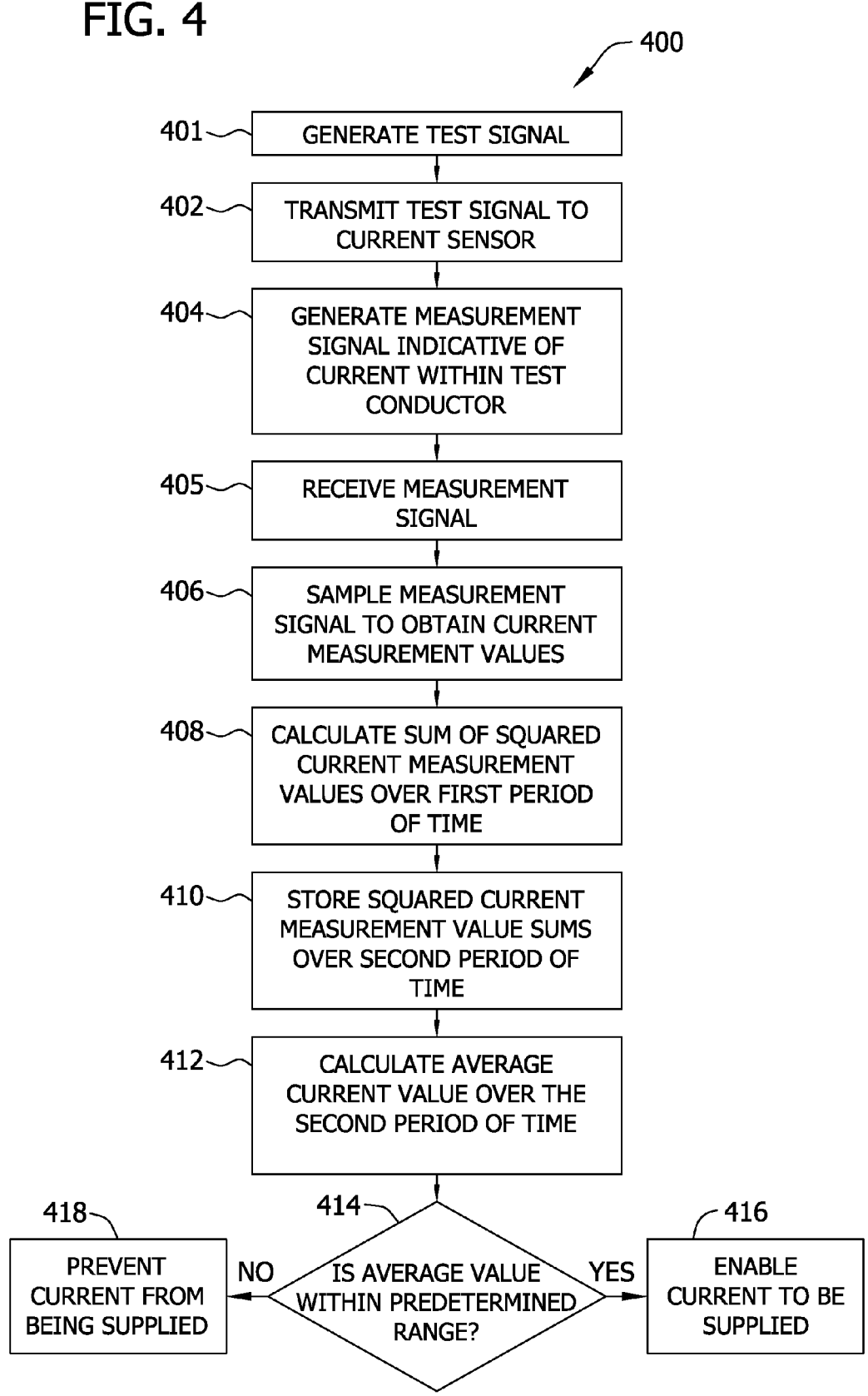

though the test conductor, and receive the current measurement signal from the current sensor. The controller is also configured to determine a status of the detection system based on the current measurement signal.

In yet another embodiment, a method of testing a detection system is provided that includes generating a test signal within the detection system, and transmitting the test signal through a test conductor to a current sensor, wherein the current sensor is configured to detect a current within the test conductor. The method also includes receiving a current measurement signal from the current sensor, wherein the current measurement signal is representative of an amount of current detected within the test conductor, and determining a status of the detection system based on the current measurement signal received.

CHARGING DEVICE, DETECTION SYSTEM, AND METHOD OF TESTING A DETECTION SYSTEM

BACKGROUND OF THE INVENTION

The present application relates generally to charging devices and, more particularly, to a charging device, a detection system, and a method of testing the detection system.

As electric vehicles and/or hybrid electric vehicles have gained popularity, an associated need to accurately manage delivery of electrical energy to such vehicles has increased. Moreover, a need to provide safe and efficient charging devices or stations has been created by the increased use of such vehicles.

At least some known charging stations include a power cable or another conductor that may be removably coupled to the electric vehicle. The charging stations receive electricity from an electric utility distribution network or another electricity source, and deliver electricity to the electric vehicle through the power cable. However, if a current-carrying conductor of a charging station improperly contacts a grounded component of the charging station and/or if current is otherwise improperly channeled to a grounded portion of the charging station, one or more ground faults may occur. Such ground faults may, for example, cause arcing to undesirably occur within, or proximate to, the charging stations and/or may cause damage to one or more components of the charging stations.

At least some known charging stations detect ground faults within the charging stations. However, if the ground fault detection circuitry fails or is disabled, a charging station, a user of the charging station, and/or an owner of the charging station may not be notified of the lack of ground fault detection capabilities of the charging station. Accordingly, the charging station may not properly respond to a ground fault to correct the ground fault and/or to mitigate damage that may result from the ground fault.

BRIEF DESCRIPTION OF THE INVENTION

In one embodiment, a charging device for use with a power storage device is provided that includes a power conduit configured to deliver current to the power storage device and a detection system configured to be coupled to the power conduit. The detection system includes a current control device coupled to the power conduit and configured to control the current delivered to the power storage device. The detection system also includes a test conductor, a current sensor coupled to the test conductor, and a controller coupled to the current sensor by the test conductor. The current sensor is arranged to detect an amount of current within the test conductor and configured to generate a current measurement signal representative of the amount of current detected. The controller is configured to generate a test signal, transmit the test signal through the test conductor, and receive the current measurement signal from the current sensor. The controller is also configured to determine a status of the detection system based on the current measurement signal.

In another embodiment, a detection system for use with a charging device is provided that includes a test conductor, a current sensor coupled to the test conductor, and a controller coupled to the current sensor by the test conductor. The current sensor is arranged to detect an amount of current within the test conductor and configured to generate a current measurement signal representative of the amount of current detected. The controller is configured to generate a test signal,

BRIEF DESCRIPTION OF THE DRAWINGS

FIG. 4 is a flow diagram of an exemplary method of testing a detection system that may be used with the detection system shown in FIG. 3.

DETAILED DESCRIPTION OF THE INVENTION

In some embodiments, the term "electric vehicle" refers generally to a vehicle that includes one or more electric motors. Energy used by electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
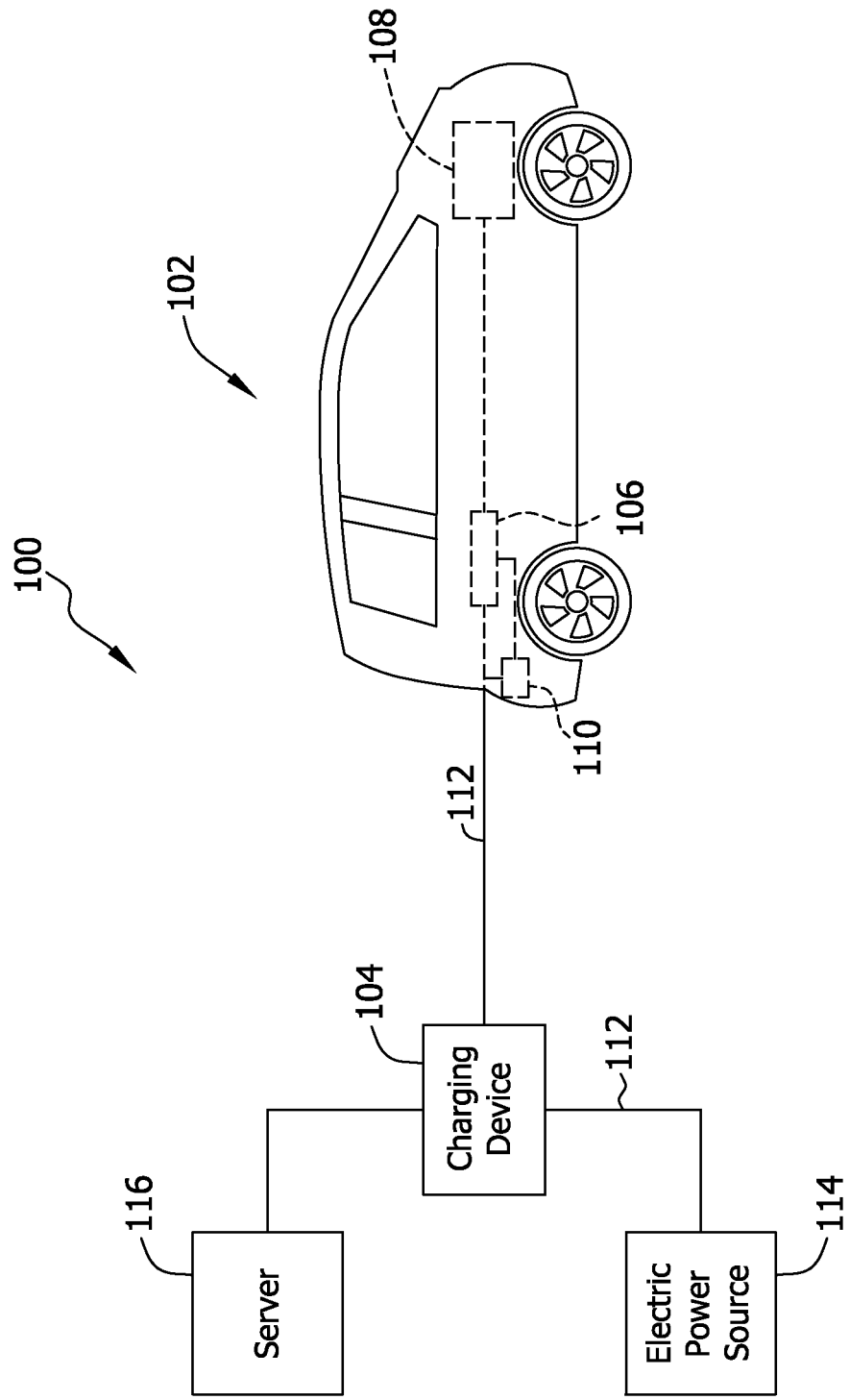
FIG. 1 is a block diagram of an exemplary system for charging an electric vehicle.

FIG. 1 illustrates an exemplary system 100 for use in charging, or providing electricity to, an electric vehicle 102. In an exemplary embodiment, system 100 includes a charging device 104 coupled to electric vehicle 102. Electric vehicle 102 includes at least one power storage device 106, such as a battery and/or any other storage device, coupled to a motor 108. Moreover, electric vehicle 102 includes a vehicle controller 110 coupled to power storage device 106.

In an exemplary embodiment, charging device 104 is removably coupled to power storage device 106 and to vehicle controller 110 by at least one power conduit 112. Alternatively, charging device 104 may be coupled to power storage device 106 and/or vehicle controller 110 by any other conduit or conduits, and/or charging device 104 may be coupled to vehicle controller 110 by a wireless data link (not shown). In the exemplary embodiment, power conduit 112 includes at least one conductor (not shown) for supplying electricity to power storage device 106 and/or to any other component within electric vehicle 102, and at least one conductor (not shown) for transmitting data to, and receiving data from, vehicle controller 110 and/or any other component within electric vehicle 102. Alternatively, power conduit 112 may include a single conductor that transmits and/or receives power and/or data, or any other number of conductors that enables system 100 to function as described herein. Moreover, in the exemplary embodiment, charging device 104 is coupled to an electric power source 114, such as a power grid of an electric utility company, a generator, a battery, and/or any other device or system that provides electricity to charging device 104.

Charging device 104 is coupled to at least one server 116 through a network, such as the Internet, a local area network (LAN), a wide area network (WAN), and/or any other network or data connection that enables charging device 104 to function as described herein. Server 116, in the exemplary embodiment, communicates with charging device 104, for example, by transmitting a signal to charging device 104 to authorize payment and/or delivery of electricity to power storage device 106, to access customer information, and/or to perform any other function that enables system 100 to function as described herein.

Server 116 and vehicle controller 110 each include at least one processor and at least one memory device. The processors each include any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory devices each include a computer readable storage medium, such as, without limitation, random access memory (RAM), flash memory, a hard disk drive, a solid state drive, a diskette, a flash drive, a compact disc, a digital video disc, and/or any suitable memory device that enables the processors to store, retrieve, and/or execute instructions and/or data.

During operation, a user couples power storage device 106 to charging device 104 with power conduit 112. The user may access a user interface (not shown in FIG. 1) of charging device 104 to enter information, such as payment information, and/or to initiate power delivery to power storage device 106. Charging device 104 is configured to communicate with server 116, for example, to authenticate the user, to process the payment information, and/or to approve or authorize the power delivery. If charging device 104 receives a signal from server 116 that indicates approval or authorization to deliver power to power storage device 106, charging device 104 receives power from electric power source 114 and provides the power to power storage device 106 through power conduit 112.

Charging device 104 communicates with vehicle controller 110 wirelessly, through power conduit 112, and/or through any other conduit, to control and/or to monitor the delivery of power to power storage device 106. For example, vehicle controller 110 may transmit signals to charging device 104 indicating a charge level of power storage device 106 and/or a desired amount and/or rate of power to be provided by charging device 104. Moreover, charging device 104 may transmit signals to vehicle controller 110 indicating an amount and/or rate of electricity being delivered to power storage device 106. Additionally or alternatively, charging device 104 and/or vehicle controller 110 may transmit and/or receive any other signals or messages that enable system 100 to function as described herein. When power storage device 106 has been charged to a desired level, charging device 104 ceases delivering power to power storage device 106 and the user disengages power conduit 112 from power storage device 106.

Figure 2:
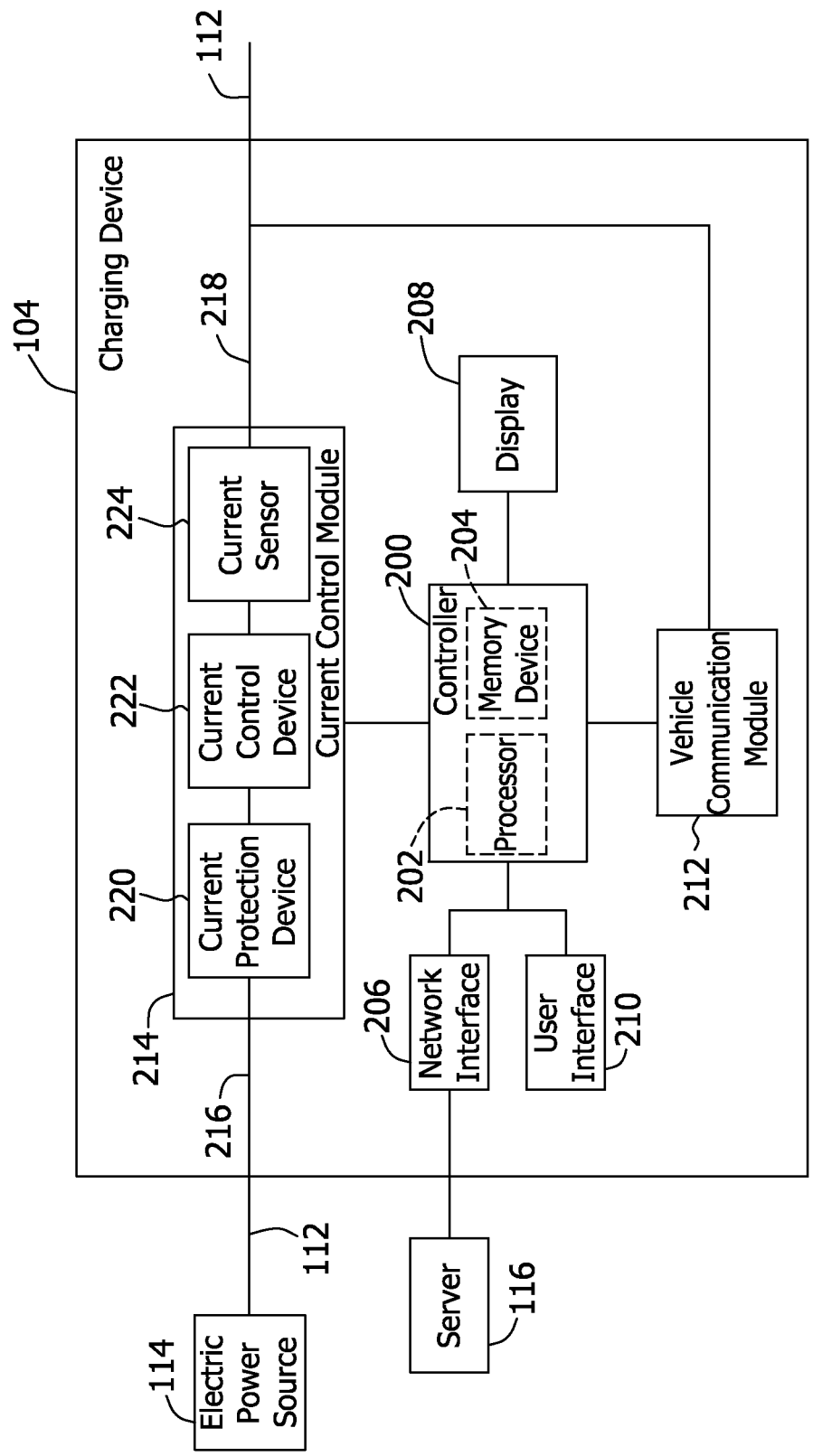
FIG. 2 is a block diagram of an exemplary charging device that may be used with the system shown in FIG. 1.

FIG. 2 is a block diagram of an exemplary charging device 104 that may be used with system 100 (shown in FIG. 1). In an exemplary embodiment, charging device 104 includes a controller 200 that includes a processor 202 and a memory device 204. As described more fully herein, controller 200 is coupled to a network interface 206, to a display 208, to a user interface 210, to a vehicle communication module 212, and to a current control module 214.

Processor 202 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 204 includes a computer readable storage medium, such as, without limitation, random access memory (RAM), flash memory, a hard disk drive, a solid state drive, a diskette, a flash drive, a compact disc, a digital video disc, and/or any suitable device that enables processor 202 to store, retrieve, and/or execute instructions and/or data.

Network interface 206, in an exemplary embodiment, transmits and receives data between controller 200 and a remote device or system, such as server 116 (shown in FIG. 1). Network interface 206 communicates with server 116 and controller 200 using any suitable communication protocol, such as a wired and/or a wireless Ethernet protocol.

Display 208 may include a vacuum fluorescent display (VFD) and/or one or more light-emitting diodes (LED). Additionally or alternatively, display 208 may include, without limitation, a liquid crystal display (LCD), a cathode ray tube (CRT), a plasma display, and/or any suitable visual output device capable of displaying graphical data and/or text to a user. In the exemplary embodiment, a charging status of power storage device 106 (shown in FIG. 1), payment information, user authentication information, power consumption information of charging device 104 and/or of electric vehicle 102, fault information of charging device 104 and/or of vehicle 102, and/or any other information may be displayed to a user on display 208.

User interface 210 includes, without limitation, a keyboard, a keypad, a touch-sensitive screen, a push button, a scroll wheel, a pointing device, a barcode reader, a magnetic card reader, a radio frequency identification (RFID) card reader, an audio input device employing speech-recognition software, and/or any suitable device that enables a user to input data into charging device 104 and/or to retrieve data from charging device 104. In an exemplary embodiment, the user may input user authentication information and/or payment information using user interface 210. Moreover, the user may operate user interface 210 to initiate and/or terminate the delivery of power to power storage device 106.

In an exemplary embodiment, vehicle communication module 212 is coupled to vehicle controller 110 (shown in FIG. 1) by power conduit 112 or by any other conduit that enables vehicle communication module 212 to function as described herein. Vehicle communication module 212 transmits data to, and receives data from, vehicle controller 110 using a suitable protocol, such as power line communication (PLC), a serial communication protocol, analog voltage level detection, duty cycle measurement, and/or any other protocol that enables vehicle communication module 212 to function as described herein. In an exemplary embodiment, vehicle communication module 212 communicates with vehicle controller 110 to control and/or adjust an amount of current that power storage device 106 draws from charging device 104.

Current control module 214 is coupled to an input end 216 of power conduit 112 and to an output end 218 of power conduit 112. Input end 216 is coupled to a power source, such as electric power source 114 (shown in FIG. 1), and output end 218 is coupled to a load, such as power storage device 106. More specifically, in an exemplary embodiment, input end 216 is coupled to a single phase of a three phase alternating current (AC) power source, such as electric power source 114. Alternatively, input end 216 may be coupled to a direct current (DC) power source or to two or three phases of an AC power source.

Current control module 214 includes at least one current protection device 220, at least one current control device 222, and at least one current sensor 224. In one embodiment, if power conduit 112 includes a plurality of conductors for receiving a plurality of phases of AC power from electric power source 114, each conductor of power conduit 112 may include a separate current protection device 220, current control device 222, and/or current sensor 224.

Current protection device 220, in an exemplary embodiment, is activated to electrically isolate input end 216 from output end 218 if the current flowing through power conduit 112 exceeds a predetermined threshold or current limit. More specifically, current protection device 220 activates, or "trips," when the current flowing through power conduit 112 exceeds a rated current limit of current protection device 220. When current protection device 220 activates or trips, current is prevented from flowing through power conduit 112 (i.e., input end 216 is electrically isolated from output end 218). In an exemplary embodiment, current protection device 220 is a circuit breaker. Alternatively, current protection device 220 may be a fuse, a relay, and/or any other device that enables current protection device 220 to function as described herein.

Current control device 222, in an exemplary embodiment, is a contactor 222 coupled to current protection device 220 by power conduit 112. Moreover, contactor 222 is coupled to, and is controlled by, controller 200. In an exemplary embodiment, controller 200 operates contactor 222 (e.g., opens contactor 222) to interrupt the current flowing through power conduit 112 if a ground fault is detected and/or if a ground fault detection system (not shown in FIG. 2) is determined to be operating incorrectly, as more fully described herein, such that input end 216 is electrically isolated from output end 218. As such, by operating or activating contactor 222, controller 200 prevents current from flowing to power storage device 106. In addition, controller 200 operates contactor 222 (e.g., closes contactor 222) to enable current to flow to power storage device 106, for example, if the ground fault detection system is determined to operate correctly.

At least one current sensor 224 measures and/or detects the current transmitted through power conduit 112 during operation of charging device 104. In an exemplary embodiment, current sensor 224 is a current transformer that measures an amount of current transmitted through power conduit 112 for use in detecting one or more ground faults. Current sensor 224 transmits one or more signals representative of the measured and/or detected current (hereinafter referred to as "current measurement signals") to controller 200.

Figure 3:
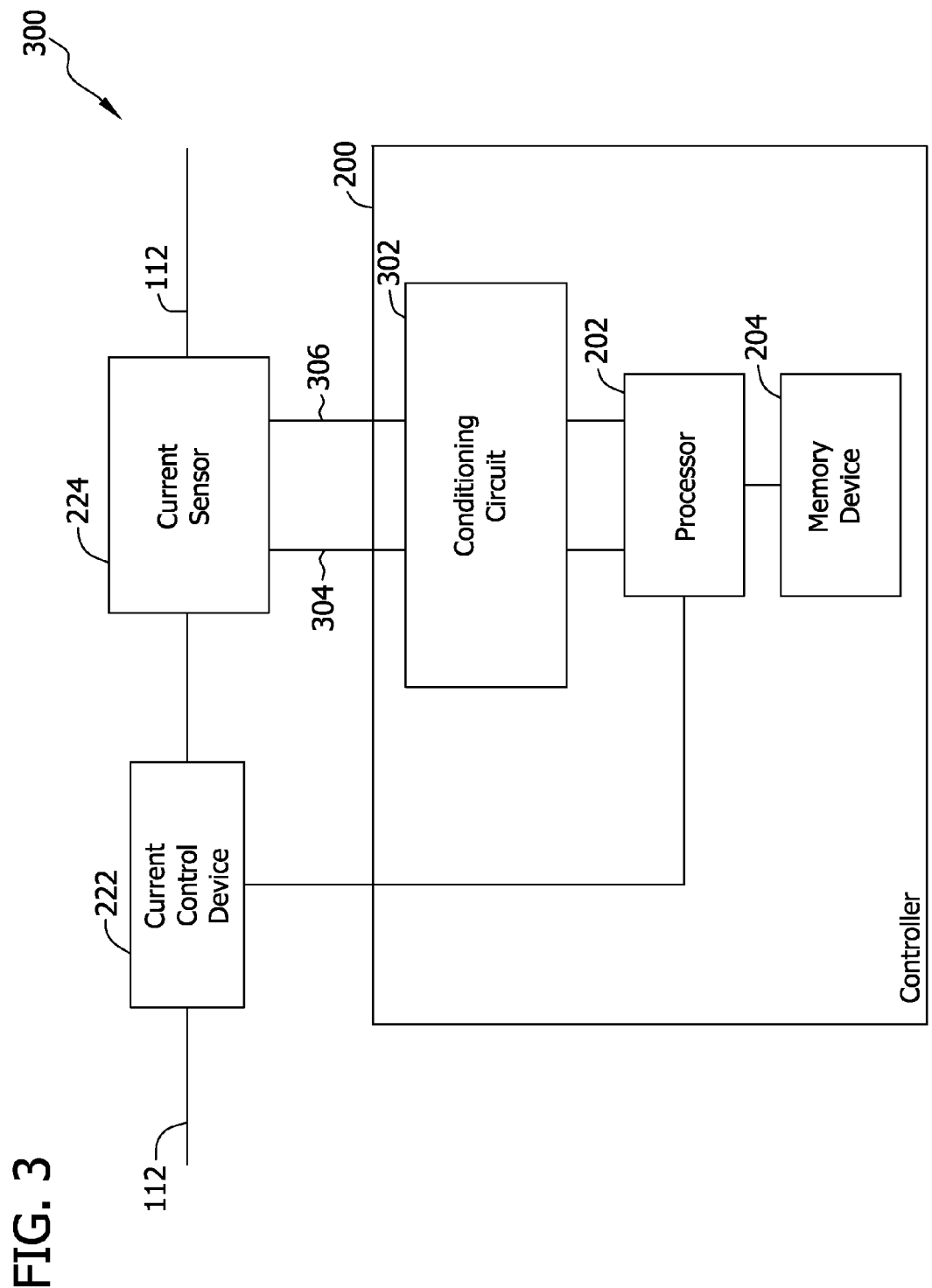
FIG. 3 is a block diagram of an exemplary detection system that may be used with the charging device shown in FIG. 1.

FIG. 3 is a block diagram of an exemplary ground fault detection system 300 that may be used with, or within, charging device 104 (shown in FIG. 1). In an exemplary embodiment, detection system 300 includes contactor 222, current sensor 224, and controller 200. Detection system 300 determines whether one or more ground faults exist and/or performs one or more self-tests to determine whether detection system operates correctly.

Controller 200, in an exemplary embodiment, includes a conditioning circuit 302 coupled to current sensor 224 and to processor 202. In an exemplary embodiment, conditioning circuit 302 is coupled to current sensor 224 by at least one detection conductor 304 and at least one test conductor 306. Current sensor 224 transmits current measurement signals to conditioning circuit 302 and to processor 202 through detection conductor 304. Processor 202 transmits one or more test signals to current sensor 224 through conditioning circuit 302 and through test conductor 306. It should be recognized that in an exemplary embodiment, current sensor 224 may receive signals from either power conduit 112 or test conductor 306, but not from both at the same time. Accordingly, in one embodiment, controller 200 operates contactor 222 to prevent current from flowing through power conduit 112 when the self-test is being performed (e.g., while the test signal is being generated).

During operation, processor 202 performs a self-test of detection system 300 while contactor 222 is open (i.e., while contactor 222 prevents current from flowing through power conduit 112). Processor 202 simulates a ground fault current by transmitting a test signal to conditioning circuit 302. In one embodiment, the test signal is a pulse width modulated (PWM) square wave signal that has a duty cycle of about 50%. Alternatively, the test signal can have any other duty cycle or may be any other signal that enables detection system 300 to function as described herein.

Conditioning circuit 302 receives the test signal and adjusts at least one characteristic of the test signal. In an exemplary embodiment, conditioning circuit 302 adjusts a voltage of the test signal such that the test signal oscillates between about −12 volts (V) and +12 V. Alternatively, conditioning circuit 302 adjusts the voltage of the test signal such that the test signal oscillates between any other voltage range, and/or adjusts a current and/or any other characteristic of the test signal. Conditioning circuit 302 transmits the adjusted test signal to current sensor 224 through test conductor 306.

Current sensor 224 measures an amount of current transmitted through test conductor 306 (i.e., an amount of current of the test signal) and outputs a signal having a current that is representative of the amount of current detected within test conductor 306 (hereinafter referred to as the "test current measurement signal"). Current sensor 224 transmits the test current measurement signal to conditioning circuit 302.

Conditioning circuit 302 adjusts at least one characteristic of the test current measurement signal. More specifically, in an exemplary embodiment, conditioning circuit 302 removes a voltage offset of the test current measurement signal and/or adjusts a voltage of the test current measurement signal for use with processor 202. Conditioning circuit 302 also converts the test current measurement signal from a current signal to a voltage signal having a voltage representative of the amount of current detected within test conductor 306. Conditioning circuit 302 transmits the adjusted test current measurement signal to processor 202.

In an exemplary embodiment, processor 202 samples the adjusted test current measurement signal to obtain a plurality of current measurement values representative of the current measured by current sensor 224. For example, processor 202 samples the test current measurement signal using an analog to digital converter (ADC) (not shown). Processor 202 calculates a square of each current measurement value and accumulates the squared current measurement values (hereinafter referred to as a "squared current value sum") over a first, or accumulation, period of time. In an exemplary embodiment, the accumulation period of time is equal to about half of a cycle (or period) of the current received from electric power source 114. For example, if electric power source 114 outputs current having a frequency of about 60 Hertz (Hz), the accumulation period is equal to about 8.33 milliseconds (ms) (i.e., half of about 16.67 ms, which is the period of the current of electric power source 114).

A second, or self-test, period of time includes a plurality of sequential accumulation periods. Processor 202 calculates and stores each squared current value sum in memory device 204 for each accumulation period within the self-test period. In an exemplary embodiment, the self-test period of time is equal to about one second. Alternatively, the self-test period of time and/or the accumulation period of time may be any suitable time period that enables detection system 300 to function as described herein.

After calculating and storing each squared current value sum during the self-test period of time, processor 202 calculates an average value of the test current (hereinafter referred to as an "average current value"). More specifically, processor 202 adds each squared current value sum within the self-test period to obtain a total current sum, and divides the total current sum by the total number of samples, or current measurement values, received by processor 202 during the self-test period.

Processor 202 then compares the average current value with a predetermined lower threshold value and a predetermined upper threshold value to determine whether detection system 300 is operating correctly (e.g., whether detection system 300 detects and/or processes the test signal correctly). If the average current value is between the lower threshold value and the upper threshold value, or is equal to the lower threshold value or the upper threshold value, processor 202 determines that detection system 300 is operating correctly by correctly detecting and/or processing the test signal generated by processor 202. However, if the average current value is lower than the lower threshold value or is higher than the upper threshold value, processor 202 determines that detection system 300 is not operating correctly because the test signal is not properly detected and/or processed.

If processor 202 determines that detection system 300 is not operating correctly, processor 202 prevents current from being supplied to electric vehicle 102, for example, by preventing contactor 222 from closing. In one embodiment, processor 202 also causes an error notification to be transmitted to a user or device, for example, to server 116 through a network, causes the error notification to be displayed on display 208, and/or causes any other suitable action to be performed. However, if processor 202 determines that detection system 300 is operating correctly, processor 202 enables current to be supplied to electric vehicle 102, for example, by closing contactor 222 to electrically couple power storage device 106 to electric power source 114.

FIG. 4 is a flow diagram of an exemplary method 400 for testing a detection system, such as detection system 300 (shown in FIG. 3). In an exemplary embodiment, method 400 includes a plurality of instructions stored within memory device 204, and is at least partially executed by processor 202 (both shown in FIG. 2).

Method 400 is executed when power conduit 112 is coupled to an electric vehicle 102 (i.e., to power storage device 106) (both shown in FIG. 1). More specifically, processor 202 executes a self-test (i.e., method 400) of detection system 300 before contactor 222 is closed, thus enabling detection system 300 to be tested before current is supplied to power storage device 106.

Processor 202 generates 401 a test signal and transmits 402 the test signal to current sensor 224 through conditioning circuit 302 and test conductor 306 (both shown in FIG. 3). The test signal is conditioned by conditioning circuit 302 to adjust the voltage of the test signal. Current sensor 224 generates 404 a test current measurement signal indicative of the current detected within test conductor 306 (i.e., the detected current of the test signal), and outputs the test current measurement signal to processor 202 through conditioning circuit 302.

Processor 202 receives 405 the test current measurement signal and samples 406 the test current measurement signal to obtain a plurality of current measurement values representative of the test signal current. Processor 202 calculates 408 a sum of squared current measurement values (i.e., a squared current value sum) over a first period of time (e.g., the accumulation period of time) as described above with reference to FIG. 3. In an exemplary embodiment, processor 202 calculates a squared current value sum for each accumulation period within the self-test period of time. Processor 202 stores 410, within memory device 204, each squared current value sum over the second, or self-test, period of time.

In an exemplary embodiment, processor 202 calculates 412 an average current value over the second period of time based on the squared current value sums, as described above with reference to FIG. 3. Processor 202 determines 414 whether the average current value is within a predetermined range, such as between the lower threshold value and the upper threshold value, or equal to the lower threshold value or the upper threshold value. If processor 202 determines 414 that the average current value is within the predetermined range, processor 202 determines that a status of detection system 300 is operational, i.e., that detection system 300 is operating correctly. Accordingly, processor 202 enables 416 current to be supplied to power storage device 106, for example, by closing contactor 222. However, if processor 202 determines 414 that the average current value is not within the predetermined range, processor 202 determines that the status of detection system 300 is non-operational or faulty, i.e., that detection system 300 is not operating correctly. Accordingly, processor 202 prevents 418 current from being supplied to power storage device 106, for example, by preventing contactor 222 from closing. Processor 202 may also generate an error notification and/or may perform any other suitable action that enables method 400 to function as described herein.

As described herein, a robust and effective charging device is provided. The charging device includes a detection system that facilitates detecting one or more ground faults within the charging device. The detection system also includes a processor configured to execute a self-test on the detection system to determine whether the detection system is operating correctly. The processor transmits a test signal to a current sensor through a test conductor, and the current sensor measures an amount of current in the test conductor. The current sensor transmits a current measurement signal to the processor. The processor calculates a square of each current value sampled from the current measurement signal and accumulates each squared value within each of a plurality of accumulation periods of time within a self-test period of time. The processor calculates an average current value based on the accumulated squared values, and determines whether the average current value is within a predetermined range. If the average current value is within the predetermined range, the processor determines that the detection system is operating correctly and enables current to be supplied to an electric vehicle. However, if the average current value is not within the predetermined range, the processor determines that the detection system is not operating correctly, and processor prevents current from being supplied to the electric vehicle. Accordingly, the detection system described herein facilitates verifying and maintaining effective and cost-efficient ground fault protection for the charging device.

A technical effect of the device, system, and method described herein includes at least one of (a) generating a test signal within a detection system; (b) transmitting a test signal through a test conductor to a current sensor, wherein the current sensor is configured to detect a current within the test conductor; (c) receiving a current measurement signal from a current sensor, wherein the current measurement signal is representative of an amount of current detected within a test conductor; and (d) determining a status of a detection system based on a current measurement signal received.

Exemplary embodiments of a charging device, detection system, and method of testing a detection system are described above in detail. The charging device, detection system, and method are not limited to the specific embodiments described herein, but rather, components of the charging device and/or detection system, and/or steps of the method may be utilized independently and separately from other components and/or steps described herein. For example, the charging device may also be used in combination with other power systems and methods, and is not limited to practice with only the electric vehicle as described herein. Rather, an exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A charging device for use with a power storage device, said charging device comprising:
    a power conduit configured to deliver current to the power storage device; and
    a detection system configured to be coupled to said power conduit, said detection system comprising:
        a current control device coupled to said power conduit and configured to control the current delivered to the power storage device;
        a test conductor;
        a current sensor coupled to said test conductor, said current sensor arranged to detect an amount of current within said test conductor and configured to generate a current measurement signal representative of the amount of current detected; and
        a controller coupled to said current sensor by said test conductor, said controller configured to:
            generate a test signal;
            transmit the test signal through said test conductor;
            receive the current measurement signal from said current sensor; and
            determine a status of said detection system based on the current measurement signal.

2. A charging device in accordance with claim 1, wherein said controller is configured to operate said current control device to prevent current from flowing through said power conduit when the test signal is generated.

3. A charging device in accordance with claim 1, wherein said controller is configured to operate said current control device based on the determined status of said detection system.

4. A charging device in accordance with claim 1, wherein said controller is configured to operate said current control device to prevent current from flowing through said power conduit if the status of said detection system is determined to be non-operational.

5. A charging device in accordance with claim 1, wherein said controller is configured to operate said current control device to enable current to flow through said power conduit if the status of said detection system is determined to be operational.

6. A charging device in accordance with claim 1, wherein said controller is configured to sample the current measurement signal to obtain a plurality of current measurement values.

7. A charging device in accordance with claim 6, wherein said controller is configured to calculate a sum of squares of the plurality of current measurement values within a first period of time.

8. A charging device in accordance with claim 7, wherein said controller is configured to calculate an average value of the current detected within said test conductor over a second period of time based on the sum of squares of the plurality of current measurement values.

9. A charging device in accordance with claim 8, wherein said controller is configured to determine that the status of said detection system is operational if the average value is within a predetermined range.

10. A detection system for use with a charging device, said detection system comprising:
    a test conductor;
    a current sensor coupled to said test conductor, said current sensor arranged to detect an amount of current within said test conductor and configured to generate a current measurement signal representative of the amount of current detected; and
    a controller coupled to said current sensor by said test conductor, said controller configured to:
        generate a test signal;
        transmit the test signal through said test conductor;
        receive the current measurement signal from said current sensor; and
        determine a status of said detection system based on the current measurement signal.

11. A detection system in accordance with claim 10, wherein said controller is configured to control a supply of current to a power storage device based on the determined status of said detection system.

12. A detection system in accordance with claim 10, wherein said controller is configured to sample the current measurement signal to obtain a plurality of current measurement values.

13. A detection system in accordance with claim 12, wherein said controller is configured to calculate a sum of squares of the plurality of current measurement values within a first period of time.

14. A detection system in accordance with claim 13, wherein said controller is configured to calculate an average value of the current detected within said test conductor over a second period of time based on the sum of squares of the plurality of current measurement values.

15. A detection system in accordance with claim 14, wherein said controller is configured to determine that the status of said detection system is operational if the average value is within a predetermined range.

16. A method of testing a detection system, said method comprising:

generating a test signal within the detection system;

transmitting the test signal through a test conductor to a current sensor, wherein the current sensor is configured to detect a current within the test conductor;

receiving a current measurement signal from the current sensor, wherein the current measurement signal is representative of an amount of current detected within the test conductor; and determining a status of the detection system based on the current measurement signal received.

17. A method in accordance with claim 16, further comprising sampling the current measurement signal to obtain a plurality of current measurement values.

18. A method in accordance with claim 17, further comprising:

calculating a sum of squares of the plurality of current measurement values for each of a plurality of accumulation periods of time within a self-test period of time; and adding each sum of squares within each of the plurality of accumulation periods of time to obtain a total current sum.

19. A method in accordance with claim 18, further comprising calculating an average value of the current detected within the test conductor by dividing the total current sum by a number of the plurality of current measurement values obtained during the self-test period of time.

20. A method in accordance with claim 19, further comprising determining the status of the detection system based on whether the average value of the current is within a predetermined range.

* * * * *